(12) United States Patent
Greenberger (10) Patent No.: US 10,015,633 B2
(45) Date of Patent: Jul. 3, 2018

(54) CONTEXT BASED ENABLEMENT OF BEACON DEVICES

(71) Applicant: International Business Machines Corporation, Armonk, NY (US)

(72) Inventor: Jeremy A. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/146,153

(22) Filed: May 4, 2016

(65) Prior Publication Data

US 2017/0325067 A1    Nov. 9, 2017

(51) Int. Cl.
| | |
|---|---|
| *H04M 3/00* | (2006.01) |
| *H04W 4/02* | (2018.01) |
| *H04W 4/00* | (2018.01) |
| *H04L 29/08* | (2006.01) |
| *G06Q 10/06* | (2012.01) |
| *H04W 4/80* | (2018.01) |

(52) U.S. Cl.
CPC .... *H04W 4/025* (2013.01); *G06Q 10/063114* (2013.01); *H04L 67/10* (2013.01); *H04L 67/26* (2013.01); *H04W 4/008* (2013.01); *H04W 4/80* (2018.02)

(58) Field of Classification Search
CPC . H04W 4/025; G06Q 10/063114; H04L 67/10
USPC .......... 455/420, 419, 414.1, 421, 422.1, 410
See application file for complete search history.

(56) References Cited

U.S. PATENT DOCUMENTS

| | | | |
|---|---|---|---|
| 9,125,022 B2 | 9/2015 | DiAcetis et al. | |
| 2014/0220883 A1 | 8/2014 | Emigh et al. | |
| 2015/0140982 A1 | 5/2015 | Postrel | |
| 2016/0323803 A1* | 11/2016 | Friday ................. | H04W 64/003 |

FOREIGN PATENT DOCUMENTS

GB      2526164 A      11/2015

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Nghi H Ly
(74) *Attorney, Agent, or Firm* — Aaron N. Pontikos; Steven L. Fisher-Stawinski (57) ABSTRACT

A computer-implemented method includes identifying a context associated with a mobile device, wherein the mobile device is capable of listening for a beacon signal. The computer-implemented method further includes determining whether the mobile device is qualified to listen for the beacon signal based on the context associated with the mobile device. The computer-implemented method further includes activating the mobile device to listen for the beacon signal.

6 Claims, 8 Drawing Sheets

CONTEXT BASED ENABLEMENT OF BEACON DEVICES

BACKGROUND

The present disclosure relates generally to beacon devices and in particular to context based enablement of beacon devices.

The Internet of Things ("IoT") is a network of physical objects or "things" embedded with electronics, software, sensors, and network connectivity, which enable these objects to collect and exchange data. Within the realm of the IoT, the use of beacons has become a practical solution for various venues (e.g., brick and mortar retail stores, airports, stadiums, hospitals, etc.) to enhance the in-venue customer experience, as well as gather valuable insight about consumer preferences. Beacons transmit a wireless signal containing small amounts of data via Bluetooth® Low Energy ("BLE") technology that can notify an application (hereinafter, "app") on a mobile device that it is within the proximity of a transmitting beacon. When an app receives the wireless signal, it then communicates the relevant data contained within the wireless signal to a server, which then triggers an action. For example, an action can be a push message (e.g., "Welcome to Megachain Electronics! Check out our sales on televisions today!"), targeted advertisements, special offers, and helpful reminders (e.g., "Batteries are located in isle 5.").

SUMMARY

A computer-implemented method includes identifying a context associated with a mobile device, wherein the mobile device is capable of listening for a beacon signal. The computer-implemented method further includes determining whether the mobile device is qualified to listen for the beacon signal based on the context associated with the mobile device. The computer-implemented method further includes activating the mobile device to listen for the beacon signal.

In an alternative embodiment of the invention, a computer-implemented method includes identifying a context associated with a mobile device, wherein the mobile device is capable of emitting a beacon signal. The computer-implemented method further includes determining whether the mobile device is qualified to emit the beacon signal based on the context associated with the mobile device. The computer-implemented method further includes activating the mobile device to emit the beacon signal.

In an alternative embodiment of the invention, a computer-implemented method includes, by a first mobile device, wherein the first mobile device is capable of performing a beacon action, the beacon action comprising listening for a beacon signal emitted by a second mobile device, receiving a trigger event from a trigger source, wherein the trigger event is generated by the trigger source. The computer-implemented method further includes identifying a first context associated with the first mobile device and a second context associated with the second mobile device. The computer-implemented method further includes determining that a qualification to listen for the beacon signal has been satisfied. The qualification is satisfied based on the first context and the second context having an overlapping context. The computer-implemented method further includes, responsive to the trigger event, selectively listening for the beacon signal.

In an alternative embodiment of the invention, a computer-implemented method includes, by a first mobile device, wherein the first mobile device is capable of performing a beacon action, the beacon action comprising emitting a beacon signal to be received by a second mobile device, receiving a trigger event from a trigger source, wherein the trigger is event is generated by the trigger source. The computer-implemented method further includes identifying a first context associated with the first mobile device and a second context associated with the second mobile device. The computer-implemented method further includes determining that a qualification to emit the beacon signal has been satisfied. The qualification to emit the beacon signal has been satisfied based on the first context and the second context having an overlapping context. The computer-implemented method further includes, responsive to the trigger event, selectively emitting the beacon signal.

In an alternative embodiment of the invention, a computer-implemented method includes, by a trigger source, wherein the trigger source is configured to instruct a first mobile device to perform a beacon action with respect to a second mobile device, generating a trigger event. The computer-implemented method further includes generating a trigger event by identifying a first context associated with the first mobile device and a second context associated with the second mobile device. The computer-implemented method further includes generating a trigger event by determining whether the first mobile device is qualified to perform a beacon action based on the first context and the second context having an overlapping context. The computer-implemented method further includes sending the trigger event to the first mobile device. The computer-implemented method further includes, responsive to the trigger event, selectively enabling the first mobile device to perform the beacon action.

DETAILED DESCRIPTION

Currently, beacon devices, such as the iBeacon®, Estimote®, and Nomi®, are standalone devices typically powered by small batteries. These beacon transmitting devices broadcast a wireless signal to nearby mobile devices (e.g., smart phones, smart watches, tablets, etc.) that have an app or operating system that is compatible with the beacon transmitting device. The combination of a beacon transmitting device and a compatible app or operating system enables a mobile device to perform actions when in close proximity to a beacon transmitting device. More specifically, beacon transmitting devices use BLE proximity sensing to transmit a universally unique identifier picked up by the compatible app or operating system. The identifier and several bytes of information sent with it can be used to determine the device's physical location, track customers, or trigger a location-based action on the device such as a check-in on social media or a push notification.

In addition to standalone beacon devices, mobile devices (e.g., smart phones, tablets, etc.) are capable of functioning as beacons, with the ability to both emit and receive beacon signals. However, the advantage that standalone beacon devices have had is their ability to enable more accurate proximity sensing via BLE than via other existing transmission technologies, such as GPS (global positioning system), cell tower triangulation and Wi-Fi proximity. Generally, a standalone beacon has the ability to approximate the distance between itself and a receiving device from as close as a few centimeters to as far as 50 meters, and as a result are often used for indoor location technology, although standalone beacons can be used outdoors as well. The ability for a standalone beacon to detect a receiving device within such short distances has created a further advantage for businesses in that each standalone beacon in an area of a venue may only transmit a wireless signal that can be received by the receiving device if the receiving device is located within the corresponding area of the transmitting beacon. As such, each beacon may transmit a signal that is associated with the respective area of the venue for which it resides.

Despite the various practical applications of standalone, battery powered beacon transmitting devices (e.g., customer service, advertising, way finding, etc.), the inventor has observed and/or recognized that currently available standalone beacons are costly. For example, standalone beacons can range from seven dollars to over one hundred dollars per unit. Depending on the size of the venue, the number of standalone beacons that are necessary, and thus their associated cost, can become expensive. Embodiments of the present invention recognize that, due to the costliness of standalone beacons, it would be desirable to utilize the existing mobile devices of employees and customers to function as beacons.

The inventor has further observed and/or recognized that currently available standalone, battery powered beacons may require the physical and timely monitoring of battery life (e.g., physically checking each device for a battery life indicator or alert) and replacement of batteries. Whereas standalone beacons may be required to be placed every twenty to thirty feet from one another, the number of people and time required to manage the devices can become burdensome in larger venues. Embodiments of the present invention recognize that, due to these problems and associated costs, it would be desirable to utilize mobile devices to function as beacons since batteries in mobile devices can be recharged.

The inventor has further observed and/or recognized that currently available standalone, battery powered beacons waste battery life by emitting a beacon at a regular interval, regardless of whether any devices are present to receive the signal. Moreover, both the rate and transmitting power of beacons have an effect on the battery life. Similarly, the inventor has further observed and/or recognized that mobile devices deploying a beacon enabled app can have a significant effect on battery drain, depending on the number of beacons present and the amount of times the mobile device scans or "listens" for a signal. Embodiments of the present invention recognize that, due to these problems, it would be desirable to enable mobile devices to transmit a signal or listen for a signal based on a context associated with the mobile device.

The inventor has further observed and/or recognized that beacon devices are prone to excessive transmission of unwanted notifications (e.g., passing through one area of disinterest to reach a second area of interest). Embodiments of the present invention recognize that, due to these problems, it would be desirable to enable mobile devices to transmit a signal or listen for a signal based on a context associated with the mobile device. The inventor has further observed and/or recognized that currently available standalone beacons exist as stationary devices within a venue, and thus are vulnerable to removal and theft. Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
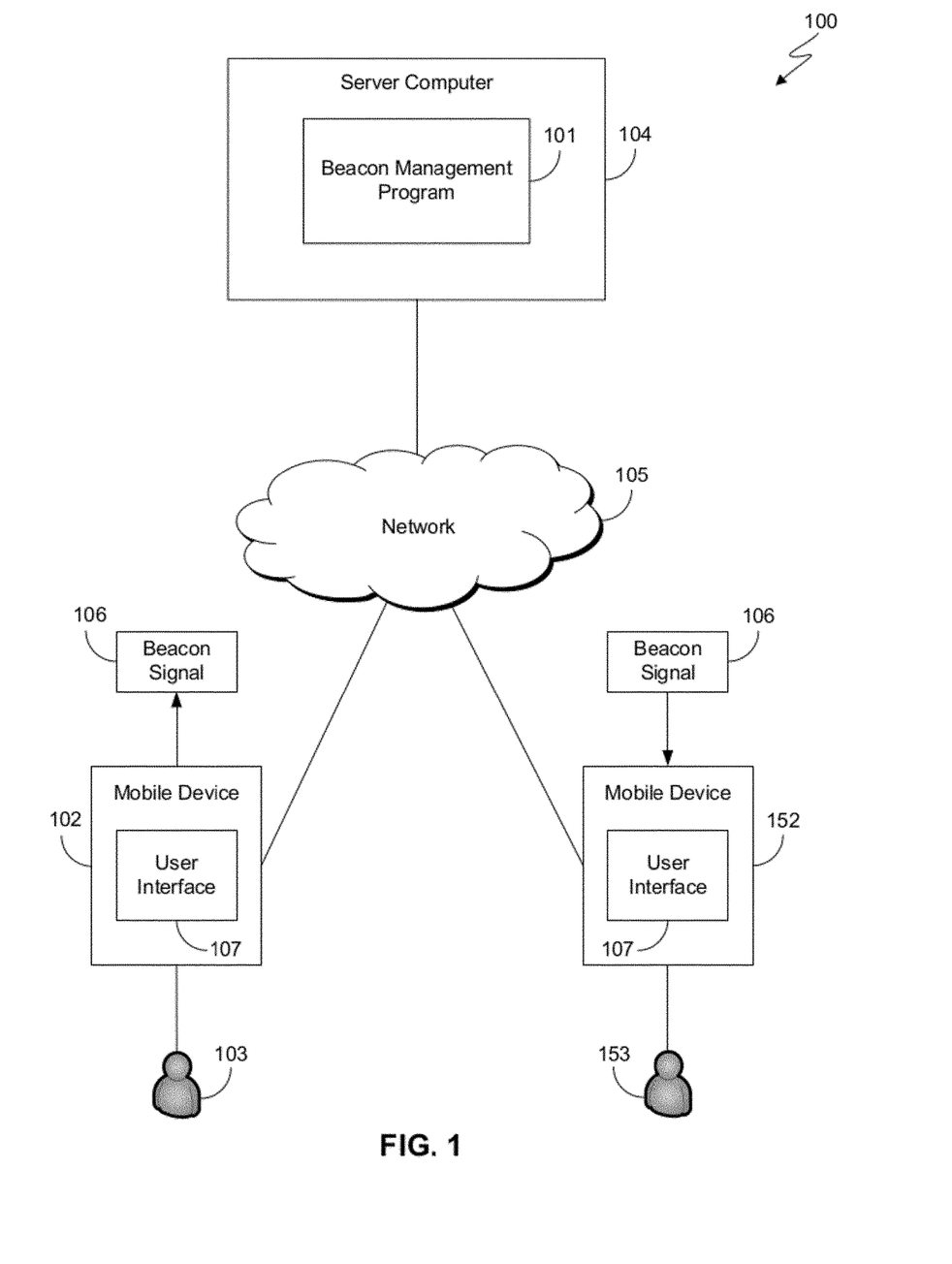
FIG. 1 is a functional block diagram of a distributed data processing environment suitable for operation of a beacon management program, in accordance with at least one embodiment of the invention.

Referring now to various embodiments of the invention in more detail, FIG. 1 is a functional block diagram of a distributed data processing environment, generally designated 100, suitable for operation of a beacon management program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 102, user 103, mobile device 152, user 153, and server computer 104, interconnected over network 105. Network 105 can be, for example, a telecommunications network, a local area network (LAN), a wide area network (WAN), such as the Internet, or a combination of the three, and can include wired, wireless, or fiber optic connections. Network 105 may include one or more wired and/or wireless networks that are capable of receiving and transmitting data, voice, and/or video signals, including multimedia signals that include voice, data, and video information. In general, network 105 may be any combination of connections and protocols that will support communications between mobile device 102 and server computer 104 or mobile device 152 and server computer 104, as well as other computing devices (not shown) within distributed data processing environment 100.

Mobile devices 102 and 152 may be a laptop computer, tablet computer, smartphone, smartwatch, or any programmable electronic device capable of communicating with various components and devices within distributed data processing environment 100, via network 105. In general, mobile devices 102 and 152 represent any programmable electronic device or combination of programmable electronic devices capable of executing machine readable program instructions and communicating with other computing devices (not shown) within distributed data processing environment 100 via a network, such as network 105. More specifically, mobile device 102 represents any device capable of listening for a beacon signal 106 and mobile device 152 represents any device capable of emitting beacon signal 106. Mobile devices 102 and 152 include user interface 107.

User interface 107 provides an interface between user 103 of mobile device 102 and/or user 153 of mobile device 152 and server computer 104. In one embodiment, user interface 107 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 107 may also be mobile application software that provides an interface between user 103 of mobile device 102 and/or user 153 of mobile device 152 and server computer 104. Mobile application software, or an "app," is a computer program that runs on smartphones, tablet computers, smartwatches and any other mobile devices.

In an embodiment of the invention, mobile device 102 is capable of listening for beacon signal 106 by means of having an app or operating system that is compatible with beacon signal 106. A beacon signal may be understood as a form of communication that includes small packets of data which are broadcast at a regular interval by via radio waves. In an embodiment of the invention, mobile device 102 may listen for an RFID beacon signal. In an embodiment of the invention, mobile device 102 may listen for a Bluetooth® beacon signal. In an embodiment of the invention, mobile device 102 may listen for a Bluetooth® Low Energy ("BLE") beacon signal. For example, a BLE beacon signal may include four main pieces of information: a universally unique identifier ("UUID") (a sixteen byte string used to differentiate a large group of related beacon signals), a Major (a two byte string used to distinguish a smaller subset of beacons signals within the larger group), a Minor (a two byte used to identify individual beacons signals), and Tx Power (used to determine proximity (distance) from the beacon signal). When an app or operating system hears (i.e., receives) the BLE beacon signal, it then communicates the relevant data (UUID, Major, Minor, and Tx) to server computer 104, which then triggers an action (e.g., a push notification, targeted advertisements, special offers, way finding, etc.) In this scenario, mobile device 102 may listen for the BLE beacon signal if mobile device 102 has activated (i.e., "turned on") its Bluetooth® mode and is able to receive the BLE beacon signal.

In an embodiment of the invention, mobile device 152 is capable of emitting beacon signal 106 by means of having an app or operating system that is capable of emitting beacon signal 106. For example, the iPhone® may be configured to act as a beacon signal transmitter. Any iPhone® model 4S or later that runs on an iPhone® Operating System 7 (iOS7) or later can be configured to act as a beacon signal transmitter using any generally known apps that are compatible with iOS7, such as the GemTOT for iOS open source app. In another example, any mobile device that has BLE hardware, the peripheral mode enabled by the device manufacture, and runs on an Android® 5.0 operating system or later can be configured to act as a beacon signal transmitter using any generally known apps that are compatible with Android® 5.0, such as QuickBeacon app.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In an embodiment, server computer 104 represents a computing system utilizing clustered computers and components (e.g., database server computers, application server computers, etc.) that act as a single pool of seamless resources when accessed within distributed data processing environment 100. Server computer 104 includes beacon management program 101 communicatively coupled to server computer 104. Server computer 104 may include internal and external hardware components, as depicted and described in further detail with respect to FIGS. 6-8.

Figure 2:
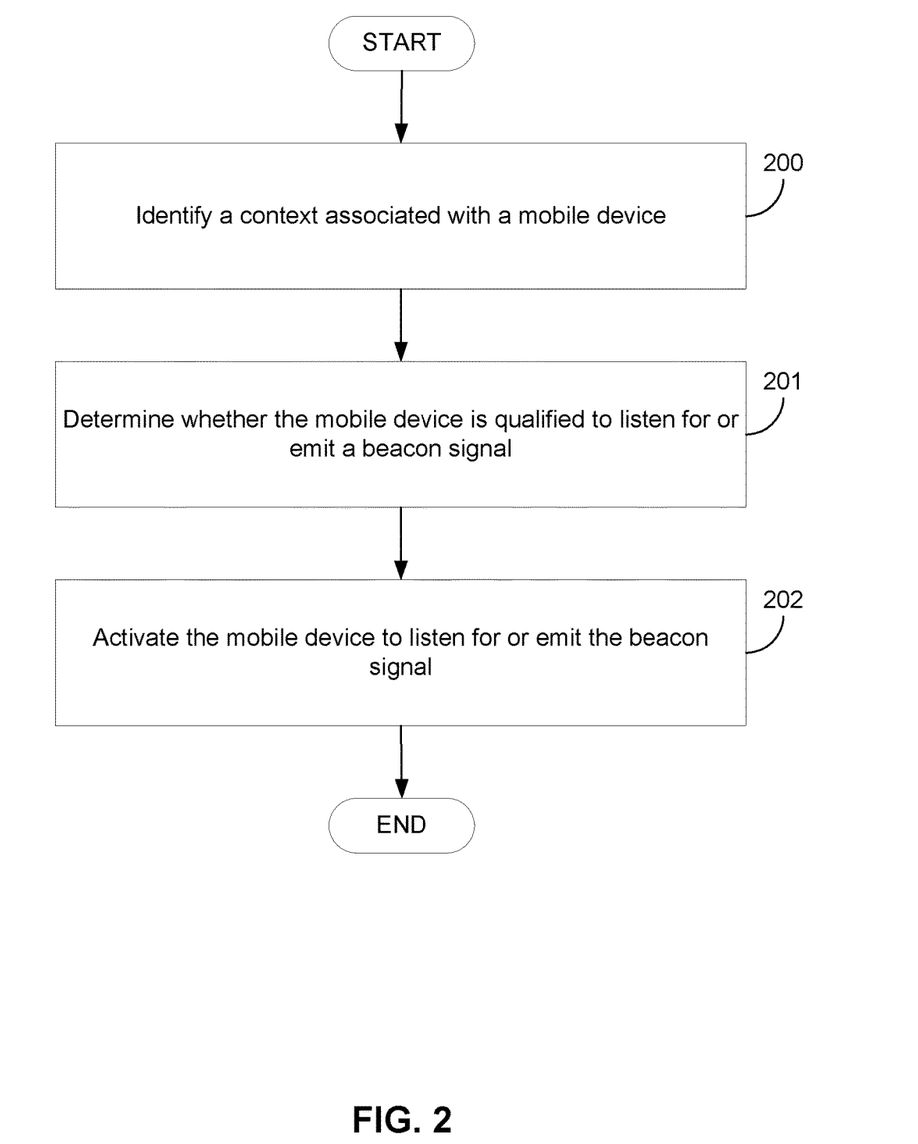
FIG. 2 is a flow chart diagram depicting operational steps for a beacon management program, in accordance with at least one embodiment of the invention.

FIG. 2 is a flow chart diagram depicting operational steps for the beacon management program 101 in accordance with at least one embodiment of the invention. In an embodiment of the invention, mobile device 102 is capable of listening for beacon signal 106. In an alternative embodiment of the invention, mobile device 152 is capable of emitting beacon signal 106. According to the depicted embodiment, at step 200, beacon management program 101 may identify a context associated with mobile device 102 and/or 152 (e.g., smartphone, smart watch, and tablet, etc.). More specifically, context may include at least one of an identity and a location. In any embodiment, context may generally be understood as any information that can characterize the situation of an entity. An entity may be a person, place or object that is considered relevant to the interaction between a user and an application, including the user and applications themselves, and by extension, the environment the user and applications are embedded in (though, it should be understood that the context is not intended to include users, people, or other naturally occurring phenomena, in themselves). Examples of contexts include location, time, proximity, user status, and device status. A venue may be understood generally as any physical location in which an individual may traverse and more specifically, as a physically defined location (e.g., merchant, store, hospital, airport, etc.). Furthermore, the venue may include one or more designated areas or zones (e.g., men's clothing, women's clothing, checkout line, waiting room, foyer, cafeteria, parking lot, etc.). Each designated area or zone may further be divided (e.g., partitions, walls, isles, etc.).

For example, an employee having mobile device 102 may work for a venue, such as a sports stadium. The venue may include various zones, such as seating zone one, seating zone two, seating zone three, seating zone four, etc. The employee's mobile device 102 may be assigned an identity (e.g., "popcorn sales" or "beverage sales"). As mobile device 102 moves throughout the venue, beacon management program 101 may identify the identity (e.g., "popcorn sales") and location (e.g., zone two) of mobile device 102. Beacon management program 101 may identify the location of mobile device 102 by any generally known location methods, such as global positioning system ("GPS") software installed on mobile device 102.

In another example, an employee having mobile device 152 may work for a venue, such as an electronics store. The venue may include various zones, such as a computer zone, mobile phone zone, appliance zone, television zone, stereo equipment zone, etc. Furthermore the employee's mobile device 152 may be assigned an identity (e.g., "appliance sales" or "computer sales"). As mobile device 152 moves throughout the venue, beacon management program 101 may identify the identity (e.g., "appliance sales") and location (e.g., "mobile phone zone") of mobile device 152. Beacon management program 101 may identify the location of mobile device 152 by any generally known location methods, including an indoor positioning system (IPS), such as Wi-Fi-based Positing Systems (WPS) located within the venue.

At step 201, beacon management program 101 may determine whether mobile device 102 is qualified to listen for beacon signal 106 based on the context associated with mobile device 102. For example, beacon management program 101 may identify the identity "appliance sales" and the location "television zone" of mobile device 102. Similarly, beacon management program 101 may identify the identity "computer sales" and the location "computer zone" of another mobile device 102. Here, beacon management program 101 may determine that only mobile device 102 having the identity "computer sales" is qualified to listen for beacon signal 106 based on the identity "computer sales" and the location "computer zone" having an overlapping context (i.e., computers).

Similarly, at step 201, beacon management program 101 may determine whether mobile device 152 is qualified to emit beacon signal 106 based on the context associated with mobile device 152. For example, beacon management program 101 may identify the identity "appliance sales" and the location "television zone" of mobile device 152. Similarly, beacon management program 101 may identify the identity "mobile phone sales" and the location "mobile phone zone" of another mobile device 152. Here, beacon management program 101 may determine that only mobile device 152 having the identity "mobile phone sales" is qualified to emit the beacon signal based on the identity "mobile phone sales" and the location "computer zone" having an overlapping context (i.e., mobile phones).

Still referring to step 201, beacon management program 101 may further determine whether mobile device 102 is qualified to listen for beacon signal 106 based on applying the context to one or more context based rules. Similarly, beacon management program 101 may further determine whether mobile device 152 is qualified to emit beacon signal 106 based on applying the context to one or more context based rules. A context based rule may generally be understood as a categorical framework for which beacon management program 101 may apply the context associated with mobile devices 102 and 152 to a rule. In an embodiment of the invention, a context based rule may be: "Only mobile device 102 having the identity "employee #3—computer sales" is qualified to listen for beacon signal 106 in the computer zone." In an embodiment of the invention, a context based rule may be: "Any mobile device 152 having the identity "employee—computer sales" is qualified to emit beacon signal 106 if the employee is present in the computer zone for longer than a threshold period of time (e.g., 20 seconds).

For example, beacon management program 101 may identify the identity "employee #2—popcorn sales" and the location "zone two" of mobile device 102. Similarly, beacon management program 101 may identify the identity "employee #4—popcorn sales" and the location "zone three" of mobile device 152. Here, beacon management program 101 may be unable to determine an overlapping context between the identity and the location of mobile device 102 and 152. In this case, the beacon management program 101 can apply the context associated with each mobile device 102 and 152 to one or more context based rules (e.g., "Employee #2 is only allowed to sell beverages in zones one and two" or "Employee #4 is only allowed to sell popcorn in zones three and four"). Now, beacon management program 101 will be able to determine that mobile device 102 having the identity "employee #2" is qualified to listen for beacon signal 106 since it is located in zone two. Similarly, beacon management program 101 will be able determine that mobile device 152 having the identity "employee #4" is not qualified to emit beacon signal 106 since it is located in zone two. It should be appreciated that the beacon management program 101 may apply the context associated with each mobile device 102 and 152 to any known context based rules.

At step 202, beacon management program 101 may activate mobile device 102 to listen for beacon signal 106. Similarly, at step 202, beacon management program 101 may activate mobile device 152 to emit beacon signal 106. In an embodiment of the invention, mobile device 102 and/or mobile device 152 may be activated by a cloud based application (i.e., beacon management program 101). For example, beacon management program 101, upon determining that mobile device 102 having the identity "computer sales" and location "computer zone" is qualified to listen for beacon signal 106, may send at least a wireless signal to activate mobile device 102 to listen for beacon signal 106. In another example, beacon management program 101, upon determining that mobile device 152 having the identity "employee #2" and location "zone two" is qualified to emit beacon signal 106, may send at least a wireless signal to activate mobile device 152 to emit beacon signal 106. In an embodiment of the invention, input denoting final authorization by user 103 or user 153 via user interface 107 is required.

Figure 3:
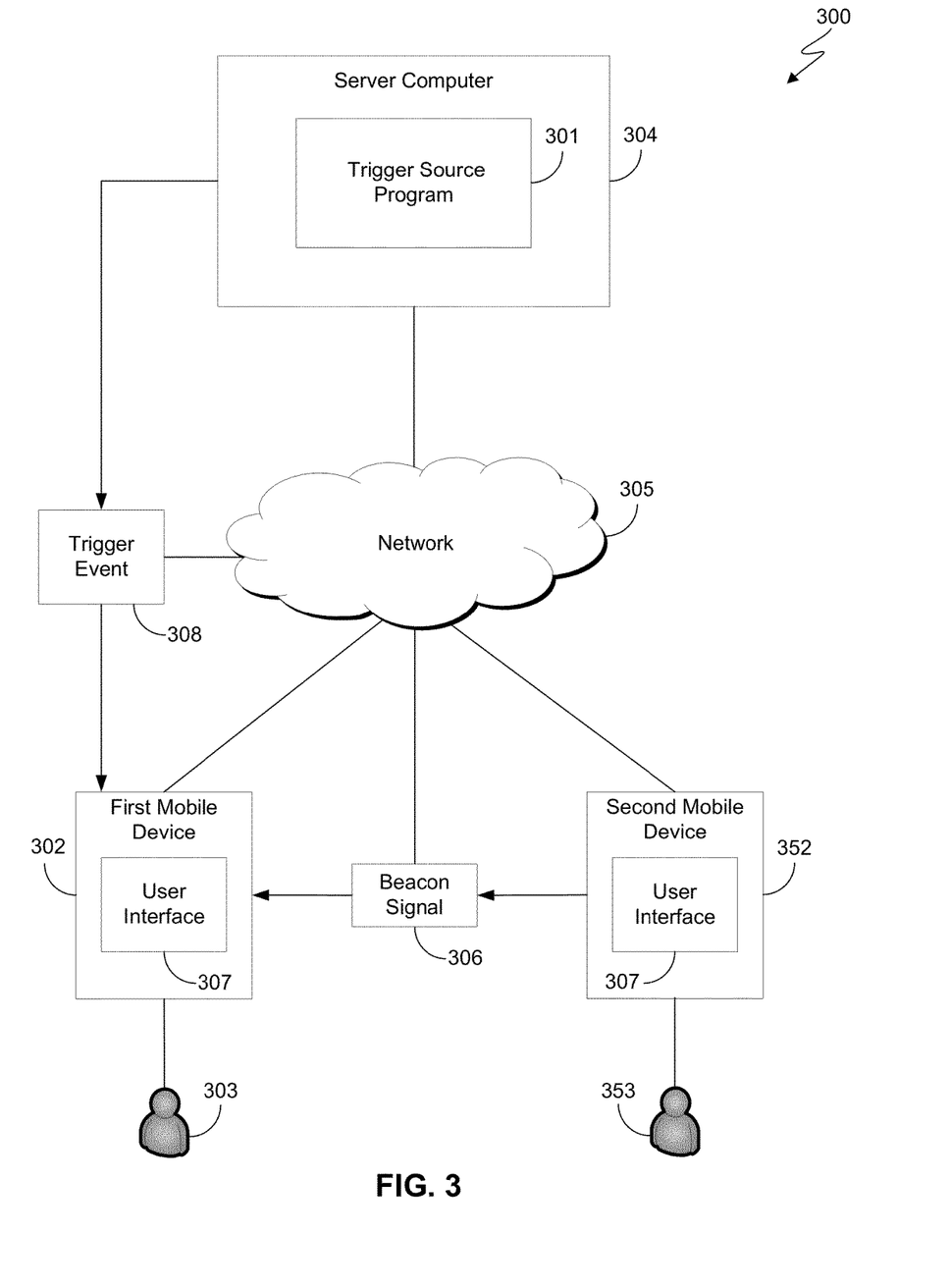
FIG. 3 is a functional block diagram of a distributed data processing environment suitable for operation of a trigger source program, in accordance with at least one embodiment of the invention.

FIG. 3 is a functional block diagram of a distributed data processing environment, generally designated 300, suitable for operation of a trigger source program in accordance with at least one embodiment of the invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 300 includes first mobile device 302, user 303, second mobile device 352, user 353, and server computer 304, interconnected over network 305. In an embodiment of the invention, first mobile device 302 and user interface 307 of distributed data processing environment 300 are functionally similar to mobile device 102 and user interface 107 of the previously described distributed data processing environment 100 of FIG. 1. Similarly, second mobile device 352 and user interface 307 of distributed data processing environment 300 are functionally similar to mobile device 152 and user interface 107 of the previously described distributed data processing environment 100 of FIG. 1. In general, network 305 may be any combination of connections and protocols that will support communications between first mobile device 302, second mobile device 352, and server computer 304, as well as other computing devices (not shown) within distributed data processing environment 100. Server computer 304 includes trigger source program 301 communicatively coupled to server computer 304. Server computer 304 may include internal and external hardware components, as depicted and described in further detail with respect to FIGS. 6-8.

Figure 4:
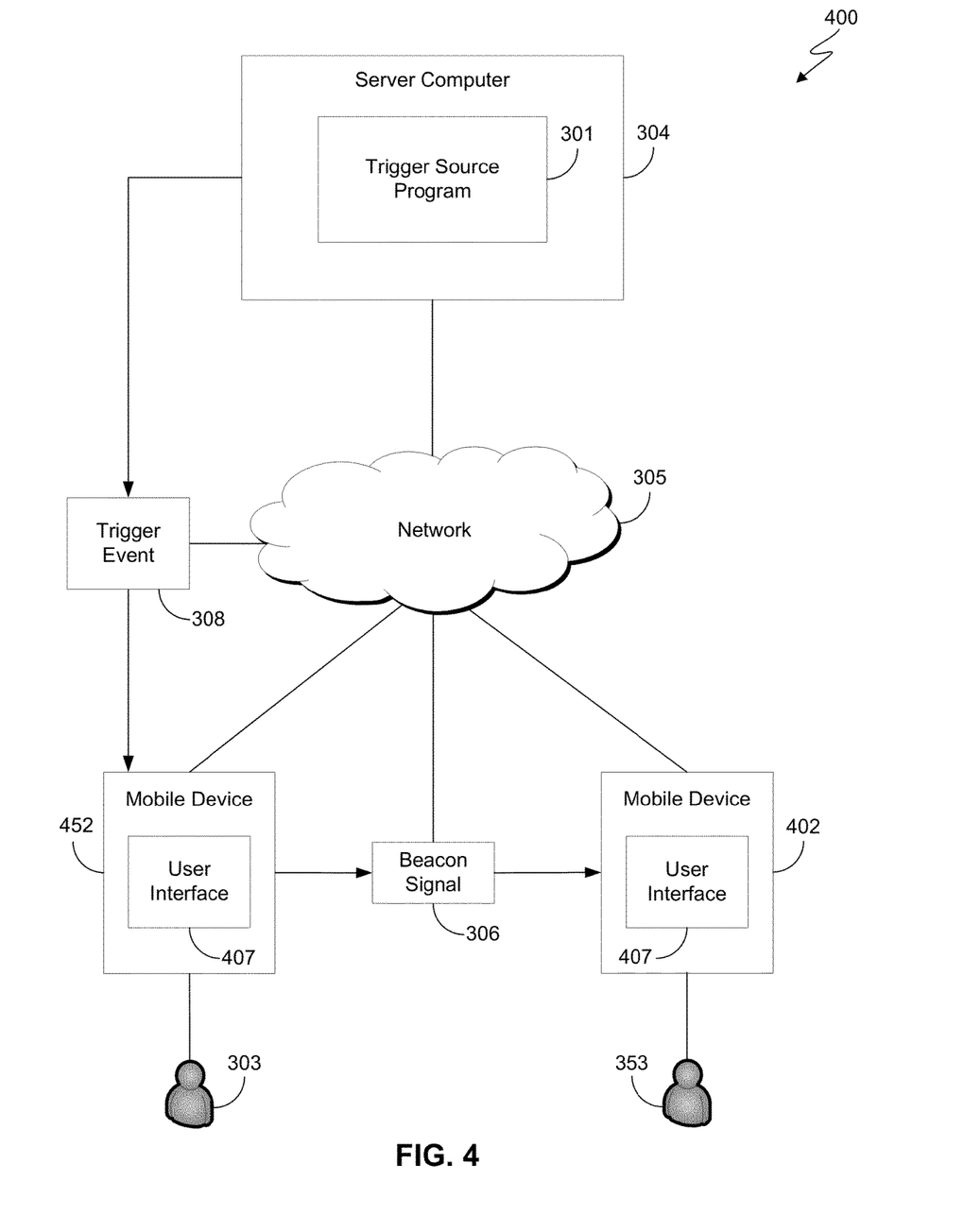
FIG. 4 is a functional block diagram of a distributed data processing environment suitable for operation of a trigger source program, in accordance with at least one embodiment of the invention.

FIG. 4 is a functional block diagram of a distributed data processing environment, generally designated 400, suitable for operation of a trigger source program in accordance with at least one embodiment of the invention. The term "distributed" as used in this specification describes a computer system that includes multiple, physically distinct devices that operate together as a single computer system. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 400 includes first mobile device 452, user 403, second mobile device 402, user 453, and server computer 304, interconnected over network 305. In an embodiment of the invention, first mobile device 452 and user interface 407 of distributed data processing environment 400 are functionally similar to mobile device 152 and user interface 107 of the previously described distributed data processing environment 100 of FIG. 1. Similarly, second mobile device 402 and user interface 407 of distributed data processing environment 400 are functionally similar to mobile device 102 and user interface 107 of the previously described distributed data processing environment 100 of FIG. 1. In general, network 305 may be any combination of connections and protocols that will support communications between first mobile device 452, second mobile device 402, and server computer 304, as well as other computing devices (not shown) within distributed data processing environment 100. Server computer 304 includes trigger source program 301 communicatively coupled to server computer 304. Server computer 304 may include internal and external hardware components, as depicted and described in further detail with respect to FIGS. 6-8.

Figure 5:
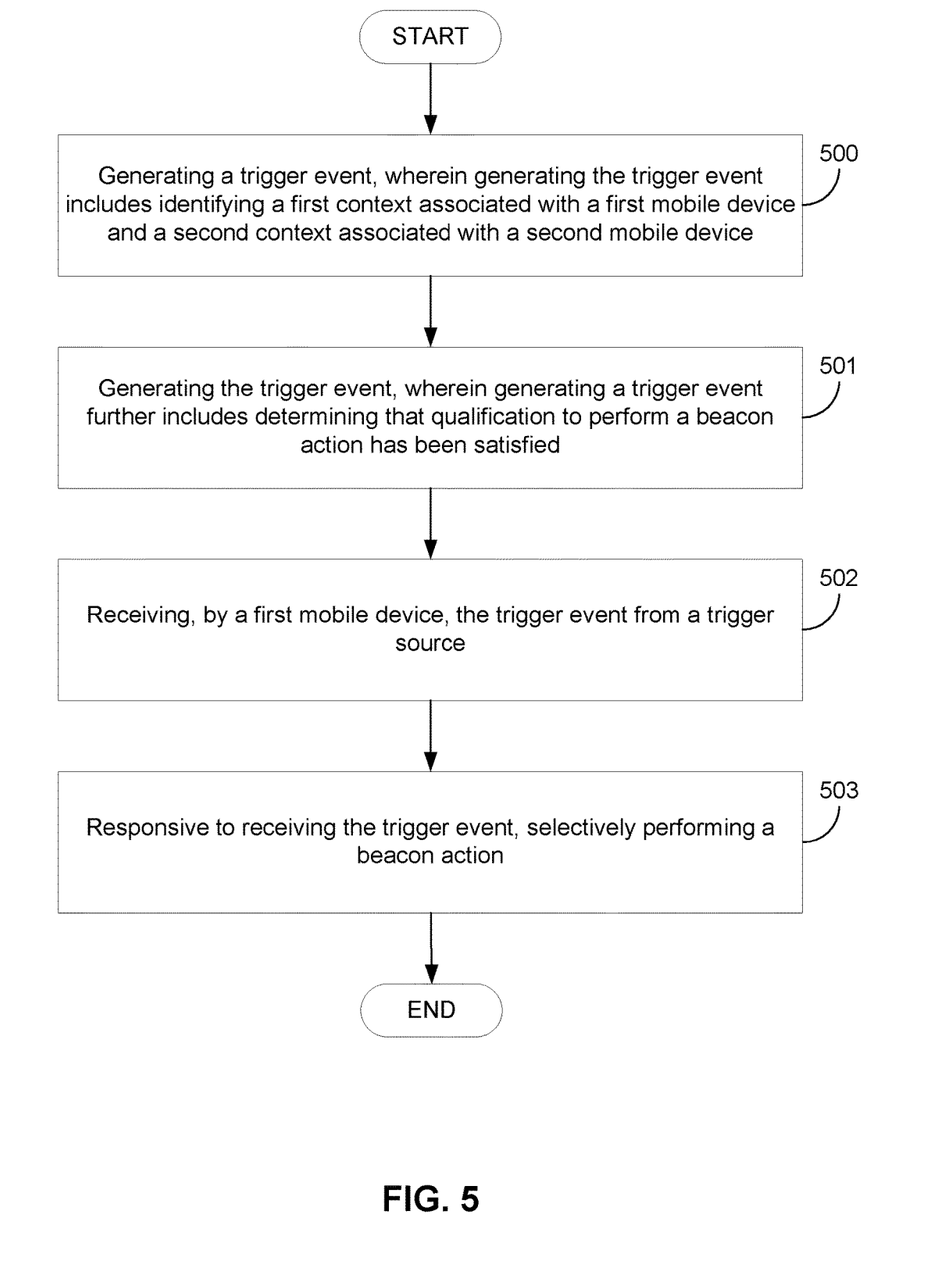
FIG. 5 is a flow chart diagram depicting operational steps for a trigger source program, in accordance with at least one embodiment of the invention.

FIG. 5 is a flow chart diagram depicting operational steps for trigger source program 301 in accordance with at least one embodiment of the invention. In an embodiment of the invention, first mobile device 302 (e.g., smartphone, smart watch, and tablet, etc.) is capable of performing a beacon action. Here, a beacon action includes listening for beacon signal 306 emitted by second mobile device 352 (e.g., smartphone, smart watch, and tablet, etc.). In an alternative embodiment of the invention, first mobile device 452 (e.g., smartphone, smart watch, and tablet, etc.) is capable of performing a beacon action. Here, a beacon action includes emitting beacon signal 306 to be received by second mobile device 402. According to the depicted embodiment, a trigger event 308 is generated by a trigger source (i.e., trigger source program 301). At step 500, generating trigger event 308 includes identifying a first context associated with first mobile device 302 and/or 452 and a second context associated with second mobile device 352 and/or 402. More specifically, the first context includes at least one of a first identity and a first location and the second context includes at least one of a second identity and a second location.

For example, various employees having first mobile device 302 and/or first mobile device 452 may work for a venue, such as a discount retail store (e.g., Big-box). The venue may include various zones, such as an electronics zone, sporting goods zone, men's clothing zone, women's clothing zone, children's clothing zone, furniture zone, etc. Furthermore, each employee's mobile device 302 and/or 452 may be assigned a first identity (e.g., "employee #5, sporting goods sales" or "employee #7, furniture sales"). Similarly, the venue may include various customers having second mobile device 352 and/or 402. Each customer mobile device 352 and/or 402 may further have a mobile app compatible with trigger source program 301. The mobile app may further allow trigger source program 301 access to various customer information, such as profile information (e.g., name, age, gender, address, email address, etc.), internet data, location data, etc. stored on a database. Here, each customer's mobile device 352 and/or 402 may be assigned a second identity ("customer—123" or "customer—456"). As each first mobile device 302 and/or 452, and each second mobile device 352 and/or 402 moves throughout the venue, trigger source program 301 may identify their identities and their locations, respectively.

At step 501, generating trigger event 308 includes determining that a qualification to perform a beacon action has been satisfied. In an embodiment of the invention, determining that a qualification to listen for beacon signal 306 has been satisfied includes detecting beacon signal 306 emitted by second mobile device 352. In an embodiment of the invention, the qualification may be satisfied based on the first context and the second context having an overlapping context. In an embodiment of the invention, an overlapping context may be first mobile device 302 and second mobile device 352 having an overlapping identity. Similarly, an overlapping context may be first mobile device 452 and second mobile device 402 having an overlapping identity. In an alternative embodiment of the invention, an overlapping context may be first mobile device 302 and second mobile device 352 having an overlapping location. Similarly, an overlapping context may be first mobile device 452 and second mobile device 402 having an overlapping location. For example, trigger source program 301 may identify first mobile device 302 having a first identity "employee #5—sporting goods sales" and a first location "appliances zone". Similarly, trigger source program 301 may identify second mobile device 352 having a second identity "customer—456" and a second location "appliances zone". Since first mobile device 302 and second mobile device 352 have an overlapping context (i.e., located in the appliances zone), first mobile device 302 is qualified to listen for beacon signal 306 being emitted by second mobile device 352.

Still referring to step 501, generating trigger event 308 may further include determining whether first mobile device 302 and/or 452 is qualified to perform a beacon action by applying the overlapping context to one or more context based rules. For example, trigger source program 301 may identify the overlapping context "located in the appliances zone" between first mobile device 302 "employee #5" and second mobile device 352 "customer—456". Trigger source program 301 may further apply the overlapping context to the context based rule: "The first mobile device 302 "employee #5" is restricted to the sporting goods zone." Here, although first mobile device 302 and second mobile device 352 have the overlapping context "located in the appliances zone", since the first identity "employee #5" of first mobile device 302 is restricted to the sporting goods zone, trigger source program 301 will determine that first mobile device 302 is not qualified listen for beacon signal 306 being emitted by second mobile device 352. On the other hand, if trigger source program 301 applied the same overlapping context to the context based rule: "The first mobile device "employee #5" is restricted to the appliances zone", then trigger source program 301 would determine that first mobile device 302 is qualified to listen for beacon signal 306 being emitted by second mobile device 352.

In another example, trigger source program 301 may identify the overlapping context "located in the furniture zone" between first mobile device 452 "employee #9—furniture sales" and second mobile device 402 "customer—123". Trigger source program 301 may further apply the overlapping context to the context based rule: "The first mobile device 452 having the identity "employee #9" is qualified to emit beacon signal 306 if second mobile device 402 is located in the furniture zone for longer than a threshold period of time (e.g., 10 seconds)". Here, if second mobile device 402 "customer 123" is located in the furniture zone for longer than 10 seconds, then trigger source program 301 will determine that first mobile device 452 is qualified to emit beacon signal 306 to be received by second mobile device 402.

At step 502, first mobile device 302 and 452 may receive trigger event 308 from a trigger source. In an embodiment of the invention, the trigger source is a cloud-based application, such as trigger source program 301. For example, trigger source program 301, upon determining that first mobile device 302 having the identity "employee #5" and the location "appliances zone" is qualified to listen for beacon signal 306 being emitted by second mobile device 352, will send trigger event 308 to be received by first mobile device 302.

At step 503, responsive to trigger event 308, first mobile device 302 may selectively listen for beacon signal 306. More specifically, selectively listening for beacon signal 306 includes trigger event program 301 sending at least a wireless signal to activate first mobile device 302 to listen for beacon signal 306. In an embodiment of the invention, input denoting final authorization by user 303 via user interface 307 is required. In any embodiment of the invention, listening for beacon signal 306 may include receiving beacon signal 306.

In an alternative embodiment, at step 503, responsive to trigger event 308, first mobile device 452 may selectively emit beacon signal 306. More specifically, selectively emit beacon signal 306 includes trigger event program 301 sending at least a wireless signal to activate first mobile device 452 to emit beacon signal 306. In an embodiment of the invention, input denoting final authorization by user 303 via user interface 407 is required.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
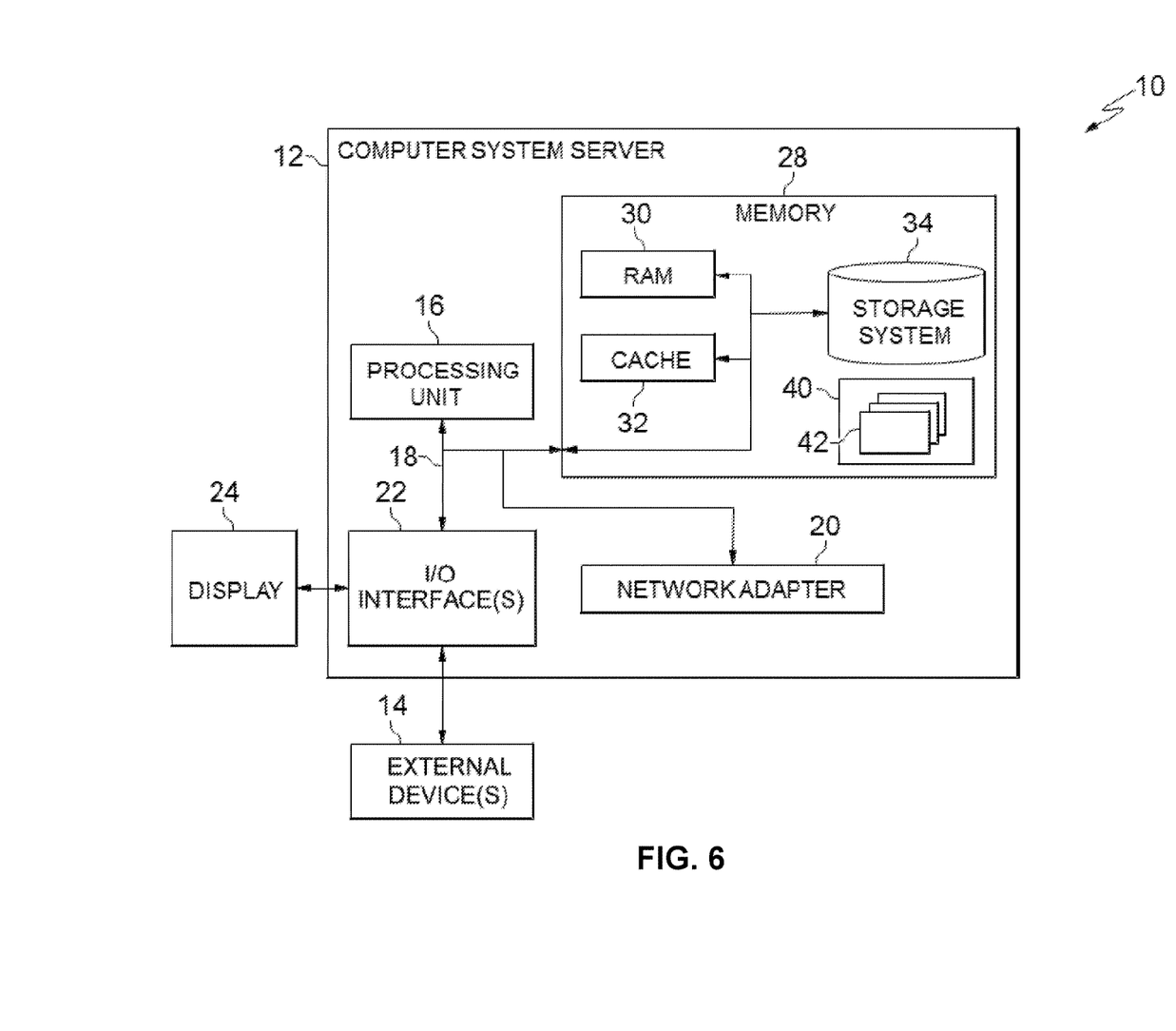
FIG. 6 is a block diagram depicting one example of a computing apparatus (e.g., cloud computing node) suitable for executing the methods disclosed herein.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
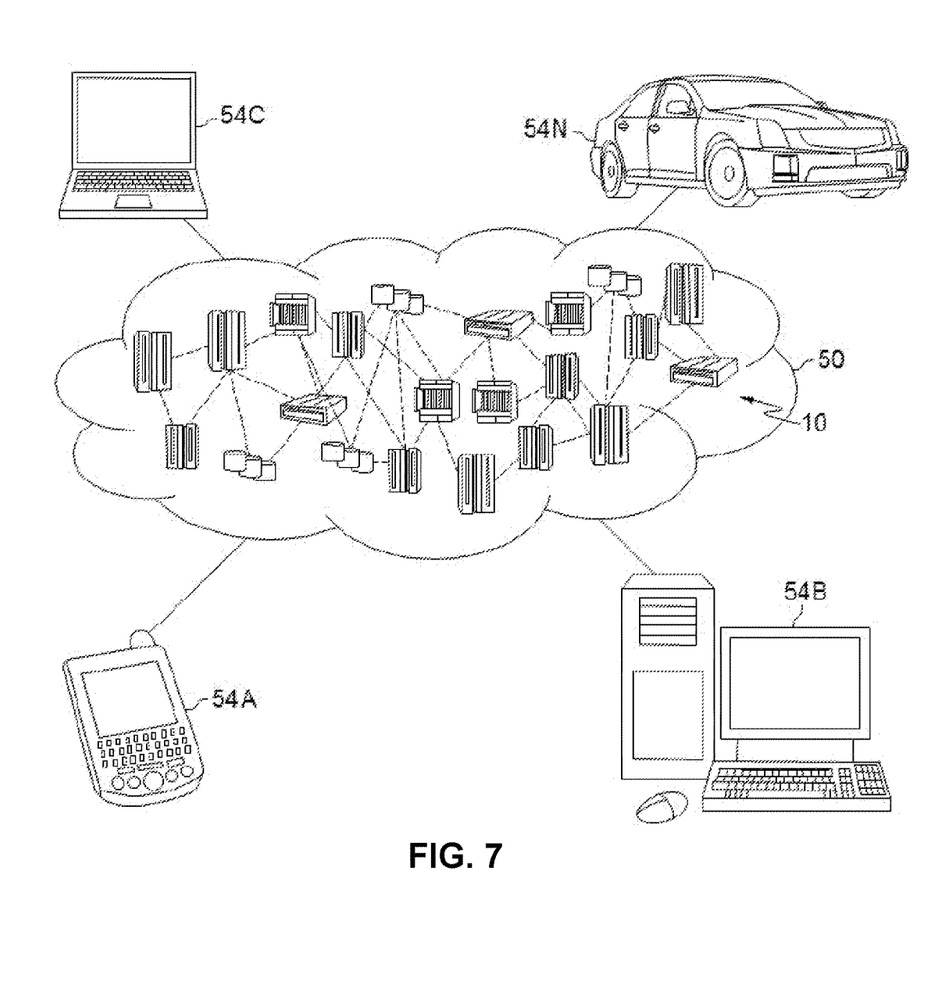
FIG. 7 depicts a cloud computing environment in accordance with at least one embodiment of the invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
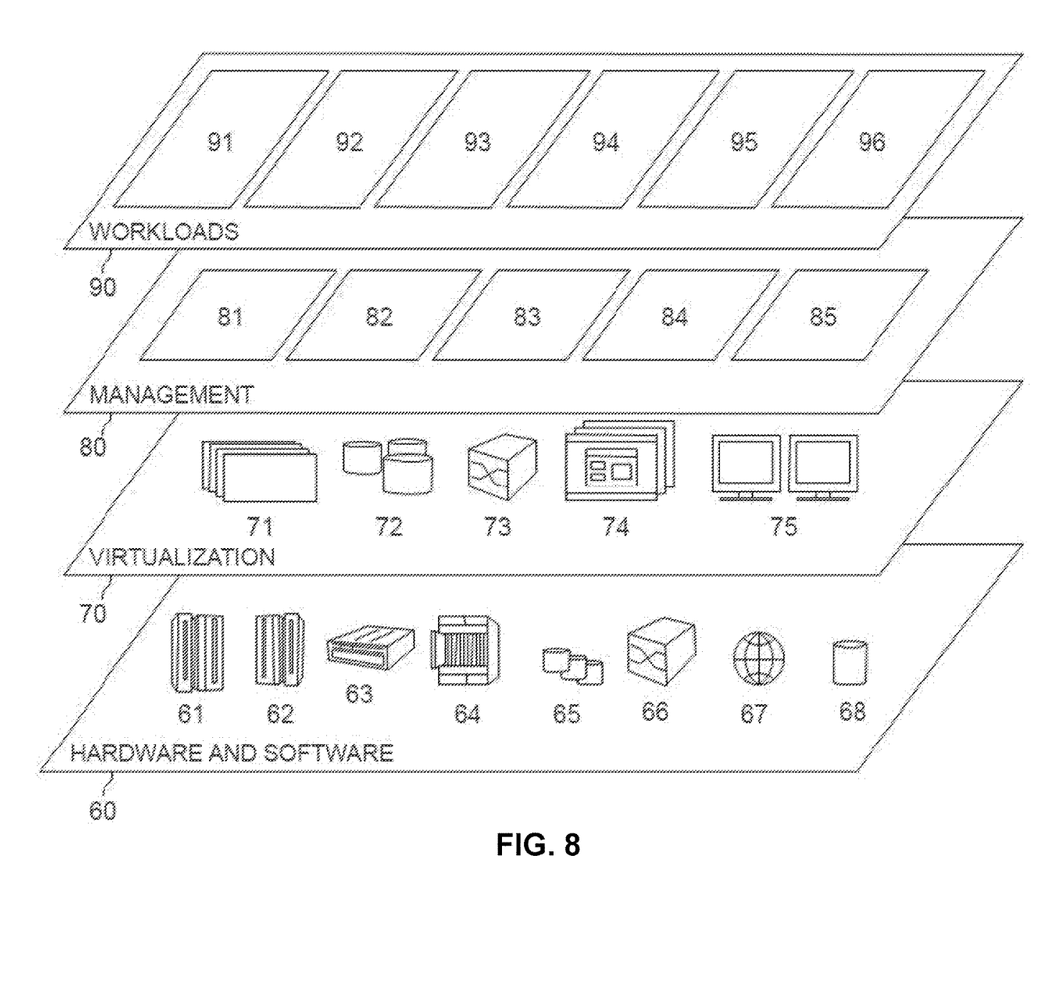
FIG. 8 depicts abstraction model layers, in accordance with at least one embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:

assigning a first location of a venue to a first mobile device, said first mobile device being restricted to listening for a beacon signal within said first location of said venue;

identifying that each of said first mobile device and a second mobile device are located at a second location of said venue;

detecting that a first beacon signal is being emitted from said second mobile device; and responsive to detecting the first beacon signal:
    activating said first mobile device to listen for said first beacon signal being emitted from said second mobile device based, at least in part, on:
        said second location of each of said first mobile device and said second mobile device at said venue being within said first location of said venue assigned to said first mobile device.

2. The method of claim 1, wherein said second mobile device is activated by a cloud-based application, said cloud-based application sending at least a wireless signal to activate said mobile device to listen for said beacon signal, wherein input denoting final authorization is required.

3. The method of claim 1, wherein activating said first mobile device to listen for said first beacon signal being emitted from said second mobile device is further based, at least in part, on:

said second mobile device being located within said first location of said venue above a threshold period of time.

4. The method of claim 1, wherein activating said first mobile device to listen for said first beacon signal being emitted from said second mobile device is further based, at least in part, on:

an identity of said first mobile device and said second mobile device.

5. The method of claim 1, wherein activating said first mobile device to listen for said first beacon signal further comprises enabling said first mobile device to receive said first beacon signal.

6. The method of claim 1, further comprising:

identifying that each of said first mobile device and said second mobile device are located at a third location at said venue; and determining that said first mobile device is not qualified to listen for a second beacon signal being admitted from said second mobile device based, at least in part, on:

said third location of each of said first mobile device and said second mobile device at said venue being outside of said first location of said venue assigned to said first mobile device.

\* \* \* \* \*